(12) United States Patent
Ritts et al.

(10) Patent No.: US 7,464,897 B2
(45) Date of Patent: Dec. 16, 2008

(54) AIRCRAFT STOWAGE BIN

(75) Inventors: Michael A. Ritts, Anacortes, WA (US); Eric M. Klein, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 11/163,801

(22) Filed: Oct. 31, 2005

(65) Prior Publication Data

US 2007/0095979 A1    May 3, 2007

(51) Int. Cl.
    *B64D 11/00* (2006.01)
(52) U.S. Cl. .................................... 244/118.5
(58) Field of Classification Search ............... 244/118.5, 244/118.1; 312/198–201
    See application file for complete search history.

(56) References Cited

U.S. PATENT DOCUMENTS

| | | | | |
|---|---|---|---|---|
| 2,575,530 A | * | 11/1951 | Reid | 312/225 |
| 4,940,297 A | * | 7/1990 | Borgen | 312/138.1 |
| 6,220,681 B1 | * | 4/2001 | Swensson et al. | 312/292 |
| 6,398,163 B1 | * | 6/2002 | Welch et al. | 244/118.1 |
| 7,222,820 B2 | * | 5/2007 | Wentland et al. | 244/118.5 |
| 2004/0119382 A1 | * | 6/2004 | Dettmann | 312/198 |

FOREIGN PATENT DOCUMENTS

DE    3301524 C1  *  7/1984

* cited by examiner

*Primary Examiner*—Tien Dinh
(74) *Attorney, Agent, or Firm*—Ostrager Chong Flaherty & Broitman P.C.

(57) ABSTRACT

Storage bins for architectural transitions in passenger cabins of airplanes and other vehicles. A transition storage bin is positioned between adjacent rows of straight storage bins and at the location where the fuselage or cabin changes cross-sectional dimensions. The front surface of the transition storage bin is curved to merge smoothly with the front surfaces of the adjacent storage bins.

11 Claims, 3 Drawing Sheets

AIRCRAFT STOWAGE BIN

TECHNICAL FIELD

The present invention relates to storage bin systems for aircraft and more particularly to storage bins with improved architectural transitions in aircraft passenger cabins.

BACKGROUND OF THE INVENTION

Most commercial airplanes today have storage bins positioned on the inside of the aircraft passenger compartments above the outboard passenger seats. The storage bins typically have hinged doors or are pivoting bins and are utilized to store luggage and other carry-on items of the passengers. The storage bins positioned adjacent to the sidewalls of the airplane are called the outboard storage (or "stowage") bins, while the storage bins positioned internally in the passenger compartment, for example, on twin aisle airliners, are called the inboard/center storage/stowage bins.

With airplanes, the fuselage narrows as it approaches the front and rear of the airplane resulting in non-constant cross-sectional areas of the cabins. In the passenger compartments of these airplanes, where the constant section bin rows end, typically the bin rows are angled forward and aft to follow the walls of the tapering fuselage. Often, the transitions between the rows of bins in the constant cross-sectional cabin areas and the fore or aft non-constant cross-sectional areas are abrupt and sharply angled. These transition areas can lose space, are not aesthetically pleasing, and require additional wedge or pie shaped components, as well as possible seals, to span and close out the space between the adjacent angled bin rows. This approach adds additional, unnecessary parts and often creates difficult and time-consuming alignments and installation issues.

The adjacent ceiling and ceiling light valence architecture are directly impacted by this angled transition. Current practice with these elements is to just miter them (abrupt transition), which leaves an architecturally abrupt appearance.

SUMMARY OF THE INVENTION

It is an object of the present invention to provide an improved storage bin and storage bin system for aircraft, which have changing cross-sectional shapes in the passenger cabins and require the storage bins to be positioned at angles to one another. It is another object of the present invention to provide storage bins in the transition areas between adjacent sets of straight rows of storage bins.

In accordance with the present invention, storage bins are provided and positioned in the transition areas between the rows of storage bins in the constant cross-section cabin area and in the narrowing non-constant cross section cabin area. The transition storage bins are functional storage bins, such as, for example, pivoting storage bins or storage bins with hinged doors.

Preferably one symmetrical transition bin is provided for placement in all four of the fore and aft transition areas in the aircraft. The inventive storage bins preferably are installed in the same manner as standard storage bins and would have similar cost and installation expense. The invention would maximize space utilization and insure a fast and accurately aligned transition area.

The top front surface edge of the inventive storage bins are curved and preferably blend to a straight line at the bottom of the bin surface. This provides a smooth blended transition between two rows of storage bins positioned at an angle to one another along the top edge and aligns the bottom of the bin with the PSU modules which are positioned along the sidewalls.

In addition, the adjacent ceiling and ceiling light valence architectural elements follow the upper curve of the symmetrical transition bin and also take on a smooth blended architectural appearance.

Other objects, benefits and features of the present invention will become apparent from the detailed description of the invention set forth below, together with a review of the drawings and claims.

DESCRIPTION OF PREFERRED EMBODIMENTS

Figure 1:
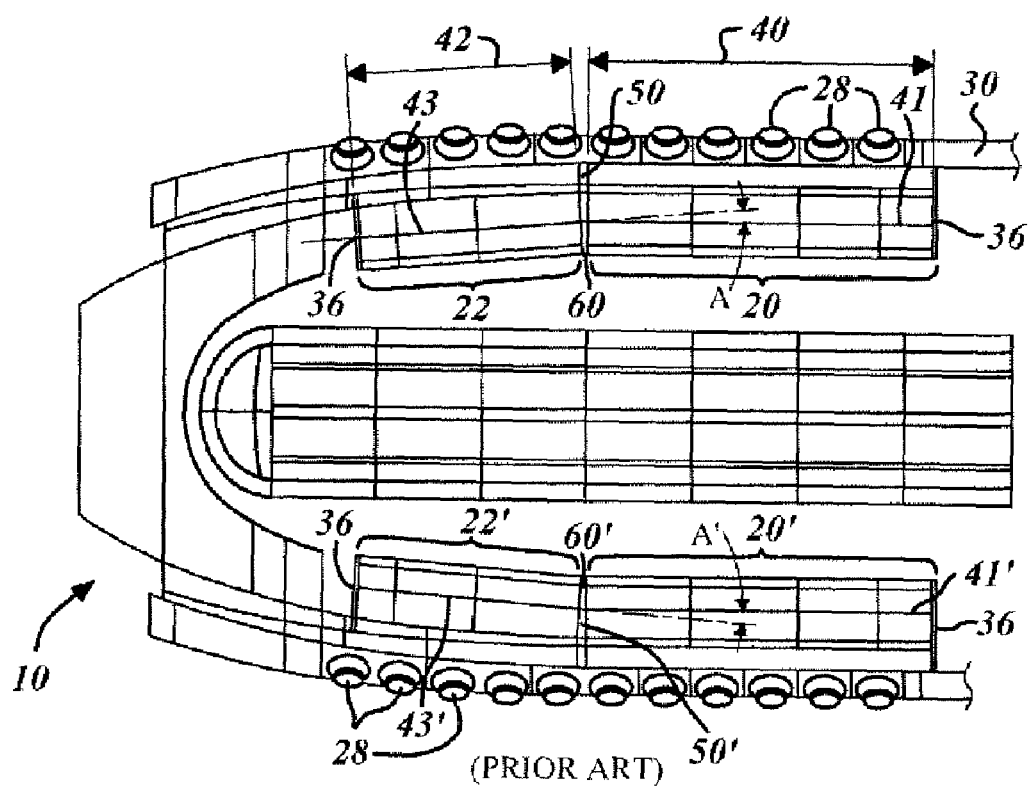
FIG. 1 is a cross sectional plan view of an aircraft illustrating the storage bins in accordance with the prior art.
Figure 2:
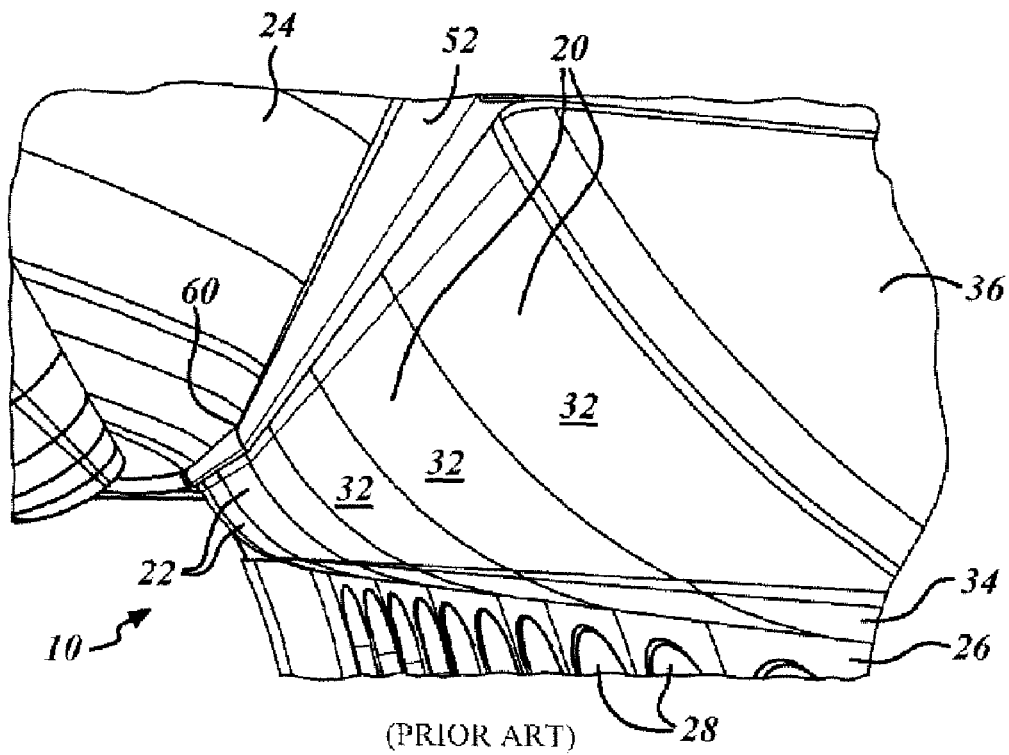
FIG. 2 is an interior perspective view of the storage bins of FIG. 1.

A typical layout of known storage bin systems in passenger compartments of large twin aisle aircraft is shown in FIGS. 1 and 2 and indicated by the reference numeral 10. The storage bins 20, 20', 22 and 22' are attached to the attachment systems of the fuselage 30 of the aircraft between the ceiling panels 24 and PSU modules 34 on the one hand and the sidewalls 26 on the other. The sidewalls have a plurality of windows 28. The storage bins are positioned in linear or straight rows, as shown. The stronger bins can be installed individually or a group of individual storage bins can be aligned and assembled together and then attached to the attachment systems of the fuselage 30 of the airplane.

The storage bins typically have front bin faces or door members 32 which are curved in the vertical direction in order to provide clearance space for the passengers and also to merge with the PSU modules 34. The bin faces or door members 32 cover the bin openings and retain the luggage and carry-on items in place during flight. The PSU modules typically include the lights, signage, air supply, attendance call buttons, and the like which are provided to the passengers during the flights. Typically end caps 36 are positioned on the ends of the rows of storage bins.

As better shown in FIG. 1, the fuselages of aircraft typically have a section 40 of the passenger compartment with a constant cross section, and a section 42 of the passenger compartment with a non-constant cross section. For this reason, the rows of storage bins 20, 20' and 22, 22' are positioned at an angle to one another along the inside surface of the fuselage. The longitudinal axes 41 and 43 of the two straight rows of storage bins 20 and 22 are typically at an angle A of one to ten degrees (1°-10°). This leaves transition areas 50, 50' between the two rows or groups of storage bins 20, 20' and 22, 22' which have a wedge or pie shape. The wedge or pie-shaped areas 50, 50' are typically hidden from view or covered by custom made panels or components, including possible seals that are necessary to span the irregular shaped areas between the adjacent straight rows of storage bins.

As shown in FIG. 1, there are typically two sets or rows of outboard storage bins in the forward portion of the aircraft. (The corresponding storage bins on the opposite walls of the cabin are referred to by the same numbers, but with one set identified with prime marks.) It is also understood that there typically are four wedge or pie-shaped transition areas in a large airplane, two in the forward cabin as shown, and two more in the aft cabin of the aircraft (not shown). The aft portions of an aircraft also have non-constant cross sections as the fuselages narrow towards the tails of the airplanes.

Positioned above the storage bins 20 is a light rail 52 which also includes a light shield and typically an environmental control system (ECS) which includes a main cabin air supply.

As better shown in FIG. 2, the transition areas 50, 50' between adjacent two straight rows of storage bins create abrupt kinks or transition lines 60, 60' which are not aesthetically pleasing. The transition areas can lose space, are architecturally compromising, and require additional added components and possible seals to span the gaps, which are both expensive and time-consuming to install.

Figure 3:
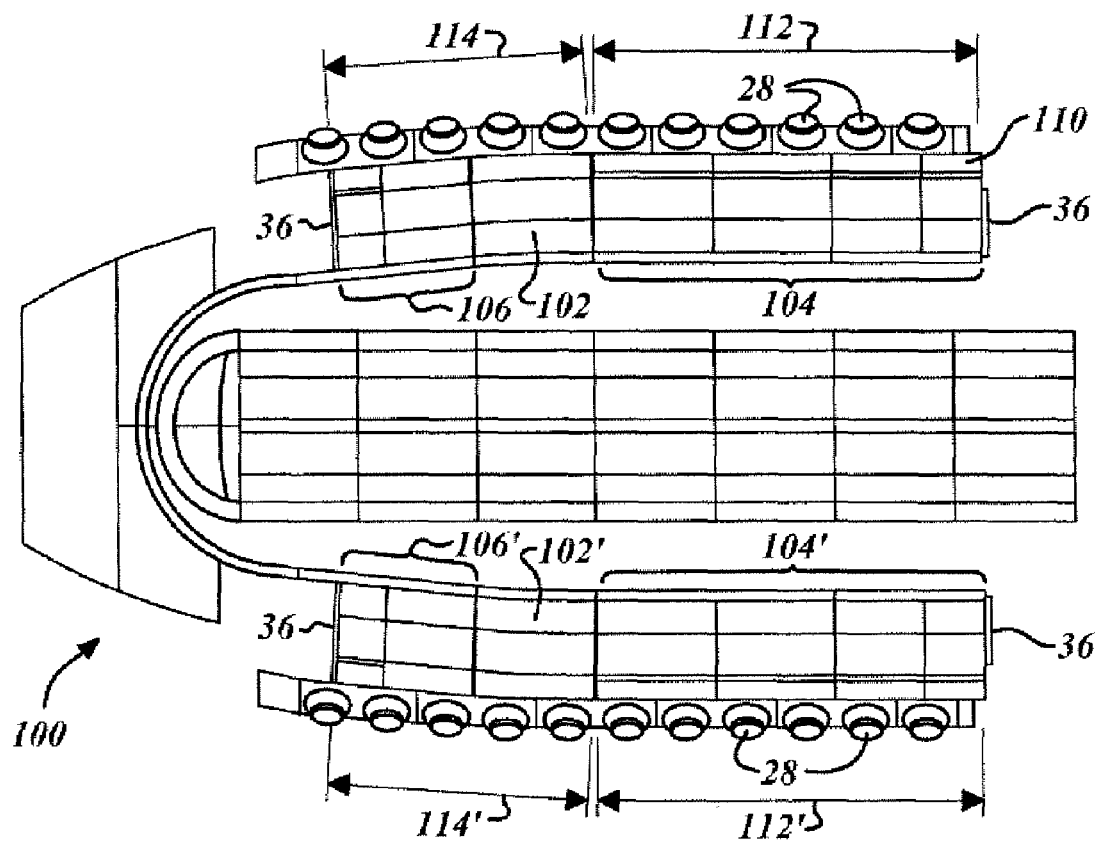
FIG. 3 is a cross sectional plan view of an interior of an aircraft showing storage bins in accordance with the present invention.
Figure 4:
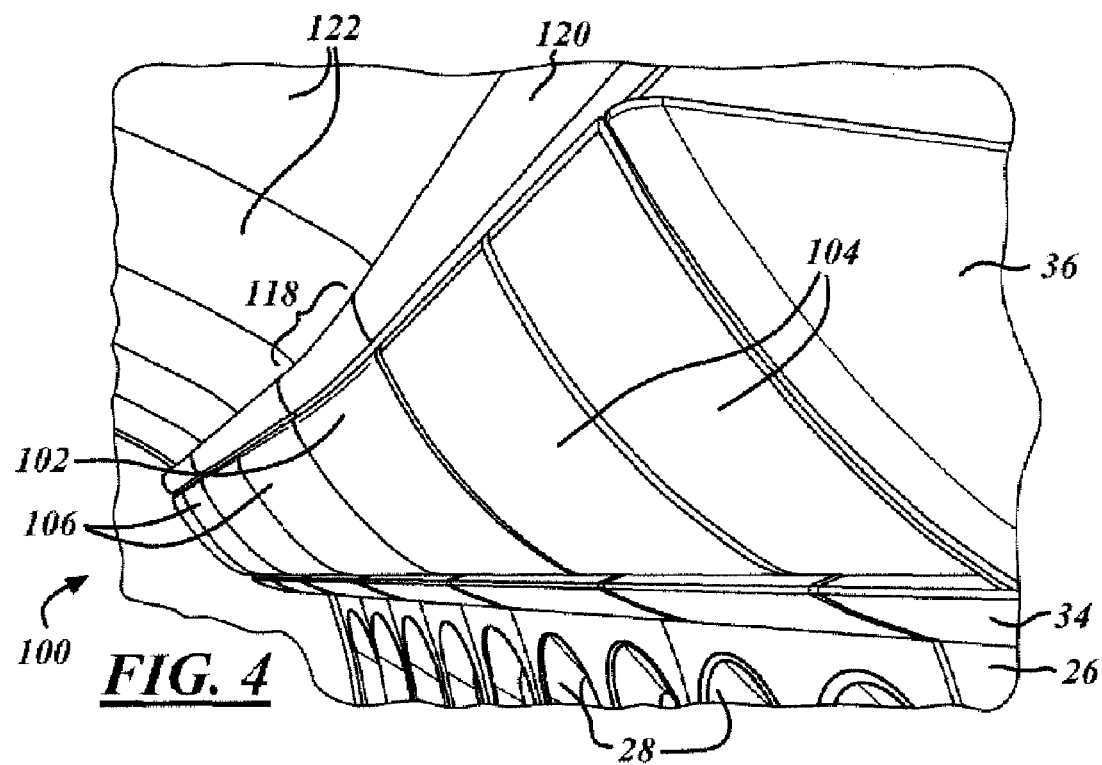
FIG. 4 is a perspective view if the storage bins as shown in FIG. 3.

An aircraft storage bin system in accordance with the present invention is shown in FIGS. 3 and 4 and referred to generally by the reference numeral 100. In accordance with the invention, a curved transition storage bin 102, 102' is positioned between the straight rows of storage bins 104, 104' and 106, 106'. On the fuselage 110 of the aircraft, the first straight section of storage bins 104, 104' is positioned along the area of constant cross section 112, 112' while the second area or group of storage bins 106, 106' is positioned along the area of non-constant cross section 114, 114'. The symmetrical transition storage bins 102, 102' are positioned at one-half the overall angle of the constant cross-section area and the non-constant cross section area bin rows. This establishes the symmetrical aspect and matched, parallel interface to the adjacent constant and non-constant bin row ends forward and aft.

Preferably, one symmetrical, full size, fully functional storage bin 102, 102' is positioned in the transition area between the two straight rows of adjacent storage bins. The one symmetrical transition bin can be utilized in all four forward and aft transition areas of the aircraft. The bin is installed in the same manner as standard bins, which maximizes space utilization and insures a fast and accurately aligned transition. For example, as shown in FIG. 4, the areas 118 between the ECS 120 and the ceiling panels 122 of the aircraft have a smooth curved configuration and does not have the kink or sharp angle as known in the prior art (FIG. 2). It is also possible to provide and install two or more transition-type storage bins in the transition area.

Figure 5:
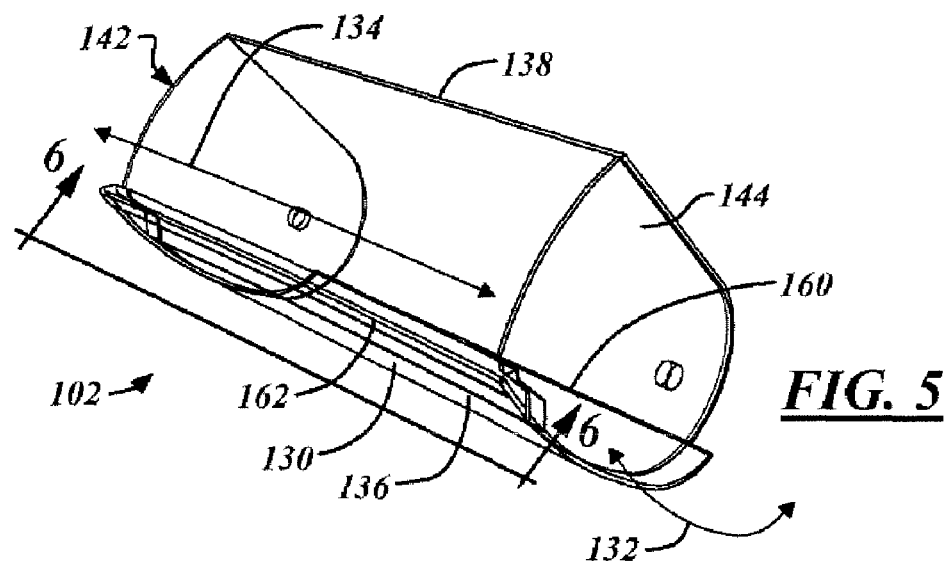
FIG. 5 schematically illustrates an embodiment of a transition stowage bin in accordance with the present invention.
Figure 6:
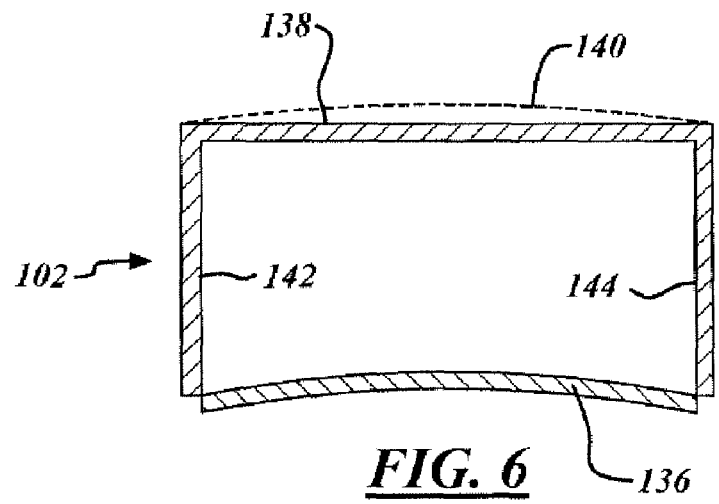
FIG. 6 is a cross-sectional plan view of the storage bin shown in FIG. 5.

As shown in FIGS. 5 and 6, the storage bin 102 preferably has a curved top front surface 130 which is curved both in the vertical direction 132 and the top edge horizontal direction 134. The inboard bin face or door member 136 is positioned on the front of the storage bin 102 and is pivoted to the walls forming the bin in the same manner that the inboard bin face member or door members are positioned in the rows of adjacent storage bins 104 and 106. Alternatively, the bin could be a box-type structure with a pivoting or hinged front door member. The rear surface 138 of the storage bin can have a straight configuration as shown in FIGS. 5 and 6 or can have a curved configuration 140 as shown in dashed lines in FIG. 6. The curve 140 would preferably match the curvature of the transition area and thus provide additional storage volume in the bin.

Figure 7:
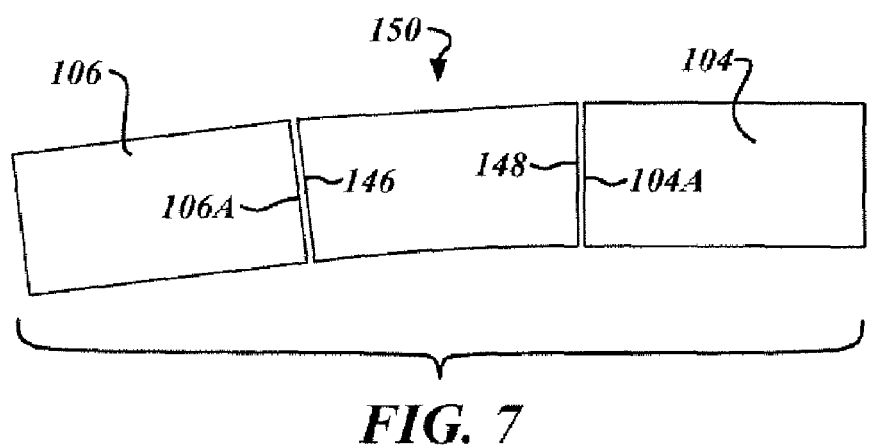
FIG. 7 illustrates an alternate embodiment of the invention.

Also, the sidewalls or end blades 142 and 144 of the storage bin 102 can be parallel to one another as shown in FIG. 6, or the sides can be angled outwardly as shown in FIG. 7 in a non-parallel orientation and relationship. In FIG. 7, the sidewalls or end blades 146 and 148 of storage bin 150 are angled in order to match the ends 104A and 106A of the bins 104 and 106, respectively.

The bottom edge 160 along the transition storage bin 102 preferably has a straight configuration in order to match the PSU modules 34. The bottom edge 160 can also be curved in a manner similar to the upper edge 162 in order to blend with the adjacent storage bins and with a correspondingly curved PSU module.

Preferably the upper exterior edge 162 of the transition storage bin is curved over the length of the bin to create a clean architecturally blended smooth transition between adjacent standard bins 104, 106. The curved bin face surface would then blend smoothly into the edge 160 at the bottom of the bin to align with the PSU modules.

With the present invention, the interior architecture of the passenger compartments of an aircraft would be enhanced. The architecture would look smooth and consistent without sharp angle changes or kinks down the interior space of the aircraft passenger compartments. The use of wedged or pie-shaped components and seals to span the irregular gaps will be eliminated.

With the present invention, the installation time for installing the storage bins in the interior of an aircraft will be decreased. The transitional storage bin can be aligned and installed in the same time and manner as the adjacent straight storage bins. Also, the pivot points of the symmetrical transitional storage bin or door members are positioned coaxially with the adjacent bins. In addition, standard PSU modules can be utilized.

Although the present invention is described and referred to as being for use in airplanes and other aircraft, the present invention can be used also with other vehicles, such as boats, trains, buses, and the like.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A storage bin system for a vehicle with a first wall surface and a second wall surface having a non-parallel relationship with an angle of about 1 to 10° therebetween and having at least one first storage bin member positioned on said first wall surface and at least one second storage bin member positioned on said second wall surface, said first and second storage bin members each having a front surface and being positioned having a space inbetween them, said improvement comprising a transition storage bin member positioned in said space, said transition storage bin member positioned on a third wall surface and having a front curved surface, wherein said front curved surface merges with the front surfaces of said first and second storage bin members, and wherein the angle defined between said first wall and said third wall, and the angle defined between said second wall and said third wall are both about 1 to 10°.

2. The storage bin system as described in claim 1 wherein a plurality of first storage bin members are provided.

3. The storage bin system as described in claim 2 wherein a plurality of second storage bin members are provided.

4. The storage bin system as described in claim 1 wherein said vehicle is an airplane and said two wall surfaces are positioned in a passenger cabin in said airplane.

5. The storage bin system as described in claim 1 wherein said transition storage bin member further comprises a first side wall member and a second side wall member, said first and second side wall members being positioned in a non-parallel relationship.

6. The storage bin system as described in claim 5 wherein said non-parallel relationship between first and second side members is in the range of 1-10°.

7. The storage bin system as described in claim 6 wherein said first and second side members are positioned at different angular orientations.

8. A storage bin system for a vehicle with a first wall surface and a second wall surface having a non-parallel relationship with an angle of about 1 to 10° therebetween and having at least one first storage bin member positioned on said first wall surface and at least one second storage bin member positioned on said second wall surface, said first and second storage bin members each having a front surface and being positioned having a space inbetween them, said improvement comprising a transition storage bin member positioned in said space, said transition storage bin member positioned on a third wall surface and having a front curved surface, wherein said front curved surface merges with the front surfaces of said first and second storage bin members, wherein the angle defined between said first wall and said third wall, and the angle defined between said second wall and said third wall are both about 1 to 10°, and wherein said transition storage bin member comprises a top wall member, a back wall member, a first side member, a second side member and a movable front member positioned between said first and second side members, said first and second side members positioned on a non-parallel relationship to each other and mating with adjacent non-parallel aligned bins.

9. The storage bin as described in claim 8 wherein said storage bin is adapted for use in a vehicle with two surfaces having different angular orientations and said storage bin is adapted to be positioned at the junction between the two surfaces.

10. The storage bin as described in claim 8 wherein said non-parallel relationship between the first and second side members is in the range of 1-10°.

11. The storage bin as described in claim 10 wherein said first and second side members are positioned at different angular orientations.

* * * * *